(12) United States Patent
Matsuura et al.

(10) Patent No.: US 9,365,059 B2
(45) Date of Patent: Jun. 14, 2016

(54) MOTOR CONTROL METHOD AND PRINT APPARATUS

(71) Applicant: CANON KABUSHIKI KAISHA, Tokyo (JP)

(72) Inventors: Masaaki Matsuura, Kawasaki (JP); Hiroshi Nakai, Sagamihara (JP); Kazuo Ohyama, Kawasaki (JP); Toshiaki Tokisawa, Kawasaki (JP); Masanori Kaneko, Kawasaki (JP); Atsushi Miyahara, Higashikurume (JP); Tomonori Sato, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/562,838

(22) Filed: Dec. 8, 2014

(65) Prior Publication Data

US 2015/0183239 A1 Jul. 2, 2015

(30) Foreign Application Priority Data

Dec. 27, 2013 (JP) .................................. 2013-272252

(51) Int. Cl.
*B41J 13/00* (2006.01)
*H02P 3/02* (2006.01)
*H02P 5/00* (2016.01)
*B41J 11/42* (2006.01)
*H02P 5/68* (2006.01)

(52) U.S. Cl.
CPC .............. *B41J 13/0009* (2013.01); *B41J 11/42* (2013.01); *H02P 3/02* (2013.01); *H02P 5/00* (2013.01); *H02P 5/68* (2013.01)

(58) Field of Classification Search
CPC ............ H02P 6/04; B41J 29/38; B41J 29/387
USPC ......................................................... 347/16
See application file for complete search history.

(56) References Cited

U.S. PATENT DOCUMENTS

| 4,694,390 | A * | 9/1987 | Lee ....................... G05B 19/358 |
| | | | 137/487.5 |
| 7,538,502 | B2 * | 5/2009 | Hongo .............................. 318/66 |
| 8,480,201 | B2 * | 7/2013 | Tokushima ....................... 347/14 |
| 2014/0300295 | A1 * | 10/2014 | Ramsingh ........................ 318/51 |

FOREIGN PATENT DOCUMENTS

JP 2009-073606 A 4/2009

* cited by examiner

*Primary Examiner* — Michael Konczal
(74) *Attorney, Agent, or Firm* — Fitzpatrick, Cella, Harper & Scinto

(57) ABSTRACT

A motor control method performed by a controller includes monitoring a motor load of at least one of a plurality of motors including a first motor and a second motor driven by one common power source having a protection circuit, wherein the protection circuit is operated to shut down the power source in a case where a current value of the power source continues to exceed a threshold during a period Tg, and stopping motor drive in a case where the monitored motor load continues to exceed the threshold during a period Tn, which is shorter than the period Tg. In addition, monitoring of the motor load is skipped during acceleration operations of the first motor and the second motor when both the first motor and the second motor are driven, and then monitoring of the motor load is restarted.

7 Claims, 7 Drawing Sheets

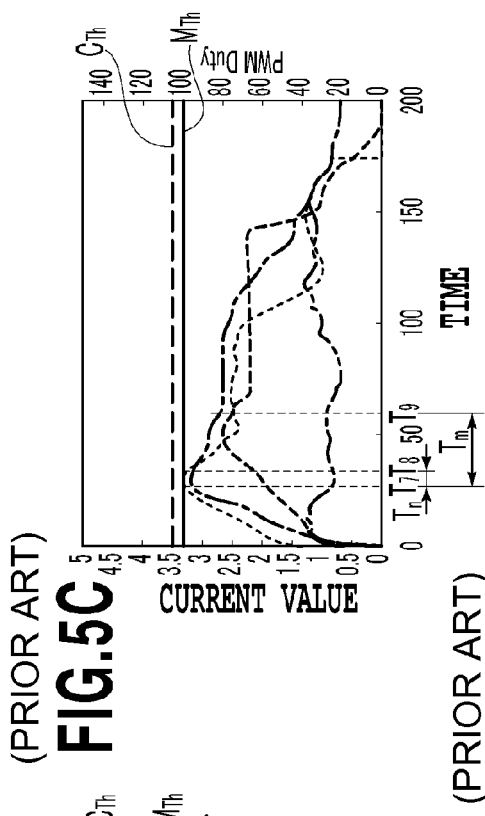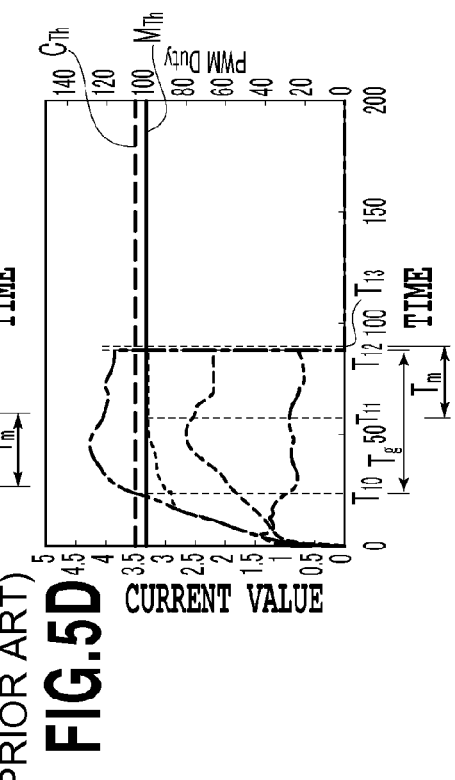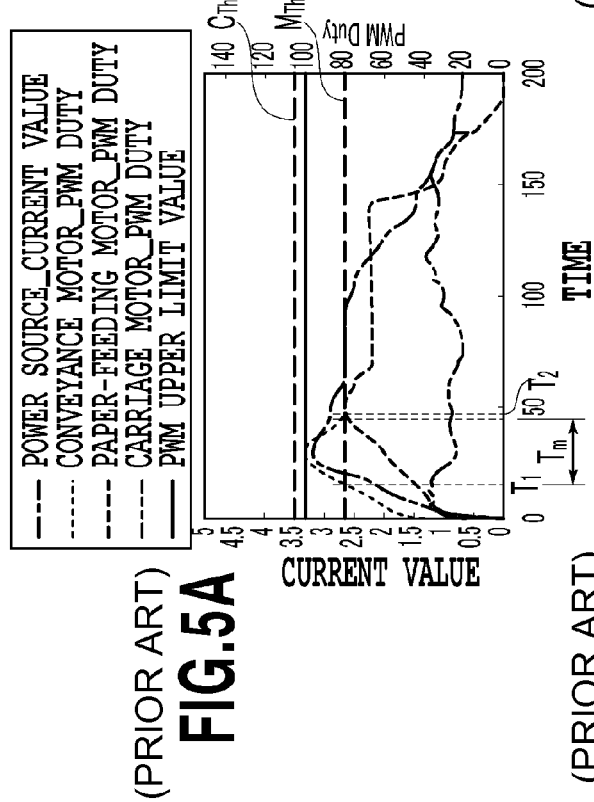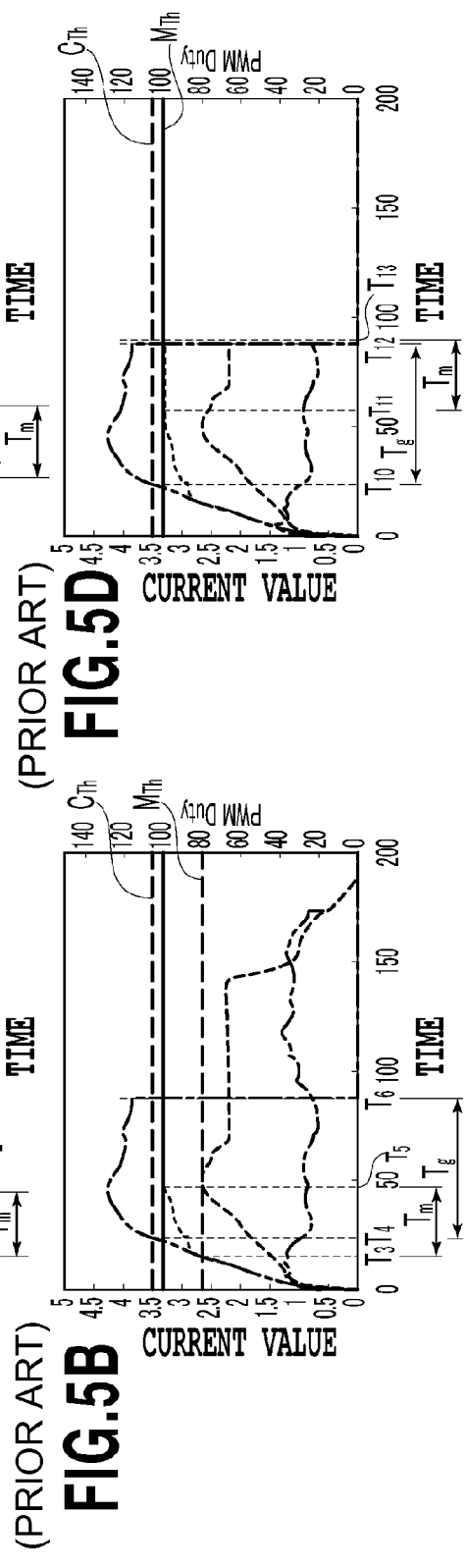
FIG. 5A (PRIOR ART)
FIG. 5B (PRIOR ART)
FIG. 5C (PRIOR ART)
FIG. 5D (PRIOR ART)

MOTOR CONTROL METHOD AND PRINT APPARATUS

BACKGROUND OF THE INVENTION

1. Field of the Invention

The present invention relates to a motor control method for controlling a drive motor and a print apparatus.

2. Description of the Related Art

A print apparatus includes a plurality of drive motors, a power source, a conveyance roller, a carriage that reciprocates, and the like. Conventionally, a pulse width modulation control (PWM control) has been generally used for a motor for driving each unit mechanism. In order to stop the drive motor in the case of contingencies such as jamming during conveyance, a PWM duty of the drive motor is monitored. Furthermore, in order to protect the power source in the case where a current value of the power source becomes abnormally high, a power source protection circuit is provided.

Japanese Patent Laid-Open No. 2009-73606 discloses a control method for stopping the drive motor before the power source is shut down, in the case where the PWM duty of a previously set threshold value or more is detected for a predetermined time or longer.

In the case where a plurality of motors is driven simultaneously by a single power source, the power source comes to have no margin with an increase in load of an entire apparatus particularly during acceleration, a voltage drop is generated, and thus a motor output is lowered. In the case of increasing the PWM duty for accelerating the motor in order to compensate for the lowered motor output, there are cases where the PWM duty exceeds the set threshold value and thus the motor cannot be correctly stopped.

Furthermore, in the case where the occurrence of jamming cannot be detected in an early stage, the power source protection circuit may be operated to thereby shut down the power source before stopping the motor. Once the power source is shut down, it takes a long time to recover, and thus a user cannot perform printing during the recovery.

SUMMARY OF THE INVENTION

The purpose of the present invention, in an apparatus including a plurality of motors driven by a common power source, is to reduce easy shutdown of a power source even in the case where the power source has a small capacity.

Therefore, a motor control method according to the present invention is a control method for monitoring a motor load of at least one of a plurality of motors including a first motor and a second motor driven by one common power source and for stopping motor drive in a case where a tolerance is exceeded, wherein a motor load is not monitored during an acceleration operation of the first motor or the second motor in a case where both the first motor and the second motor are driven.

In the apparatus including the plurality of motors driven by the common power source, even the power source having a small capacity, easy shutdown of the power source is reduced. With this arrangement, both of user's convenience and miniaturization/cost reduction of the apparatus due to a smaller capacity of the power source can be achieved.

Further features of the present invention will become apparent from the following description of exemplary embodiments (with reference to the attached drawings).

BRIEF DESCRIPTION OF THE DRAWINGS

FIG. 5A is a graph illustrating a PWM duty of a motor and a waveform of a current value of a power source according to the prior control;
FIG. 5B is a graph illustrating the PWM duty of the motor and the waveform of the current value of the power source according to the prior control;
FIG. 5C is a graph illustrating the PWM duty of the motor and the waveform of the current value of the power source according to the prior control;
FIG. 5D is a graph illustrating the PWM duty of the motor and the waveform of the current value of the power source according to the prior control.

DESCRIPTION OF THE EMBODIMENTS

Figure 1A:
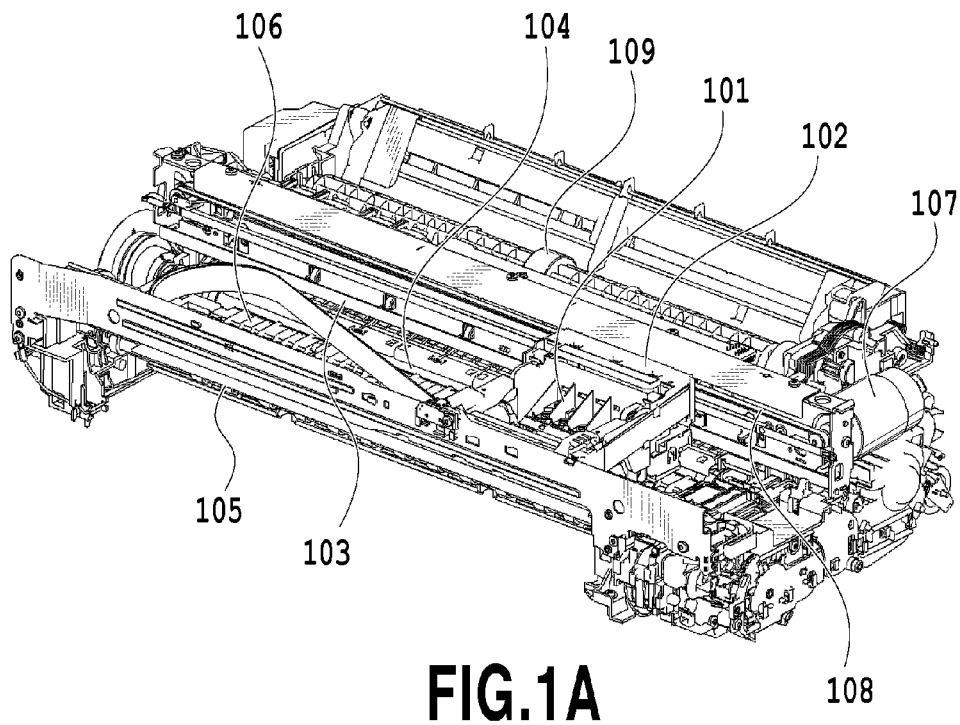
FIG. 1A is a perspective view of an image print apparatus.
Figure 1B:
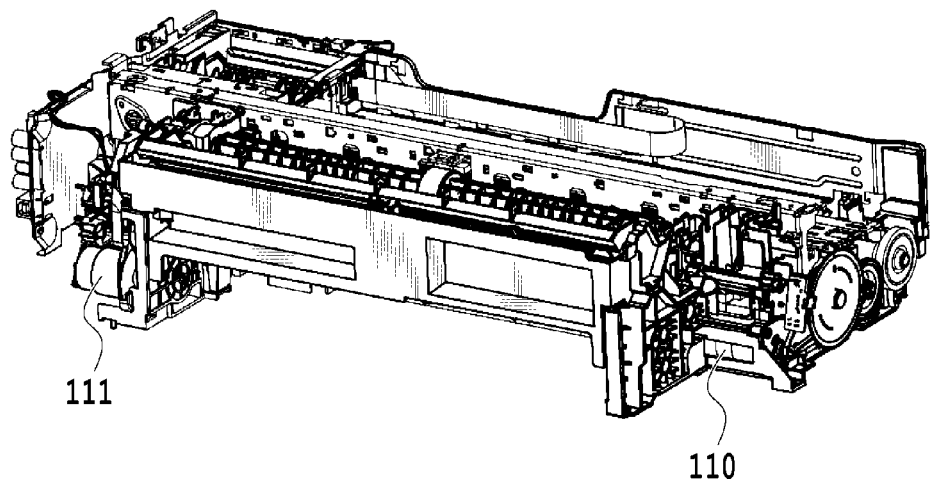
FIG. 1B is a perspective view of the image print apparatus.

Hereinafter, an embodiment of the present invention will be described with reference to drawings. Meanwhile, in all drawings, the same reference symbol indicates the same or corresponding parts FIGS. 1A and 1B are perspective views of an image print apparatus adopting a motor control method of the present invention. A scanning body 102 mounting a print head 101 is supported to be capable of reciprocating along a guide 103 extending in a main scanning direction. The scanning body 102 is driven by a carriage motor 107 via a belt 108. A print medium such as a sheet is fed by a paper-feeding roller 109 driven via a gear train by a paper-feeding motor 111 of a paper-feeding mechanism, and transferred onto a platen 106 by a conveyance roller 104 and a pinch roller (not illustrated).

A paper-discharging roller 105 is disposed on a conveyance downstream side of the platen 106, and an auxiliary roller (not illustrated) is pressed against the paper-discharging roller 105. The conveyance roller 104 and the paper-discharging roller 105 are driven by the conveyance motor 110 via the belt and the gear train. The print head 101 performs printing on the print medium conveyed on the platen 106 by the conveyance roller 104 and the paper-discharging roller 105.

In the case where the printing is performed on the print medium, the scanning body 102 is accelerated from a stop state and then moved at a constant speed throughout a scanning area of a printing operation. At this time, ink is ejected from an ejection port of the print head 101 onto the print medium to form an image. After the printing for one line is finished by one or a plurality of times of scanning, the scanning body 102 decreases the speed and stops. Subsequently, by rotation of the conveyance roller 104 and the paper-discharging roller 105, the print medium is fed by a predetermined amount.

Figure 2:
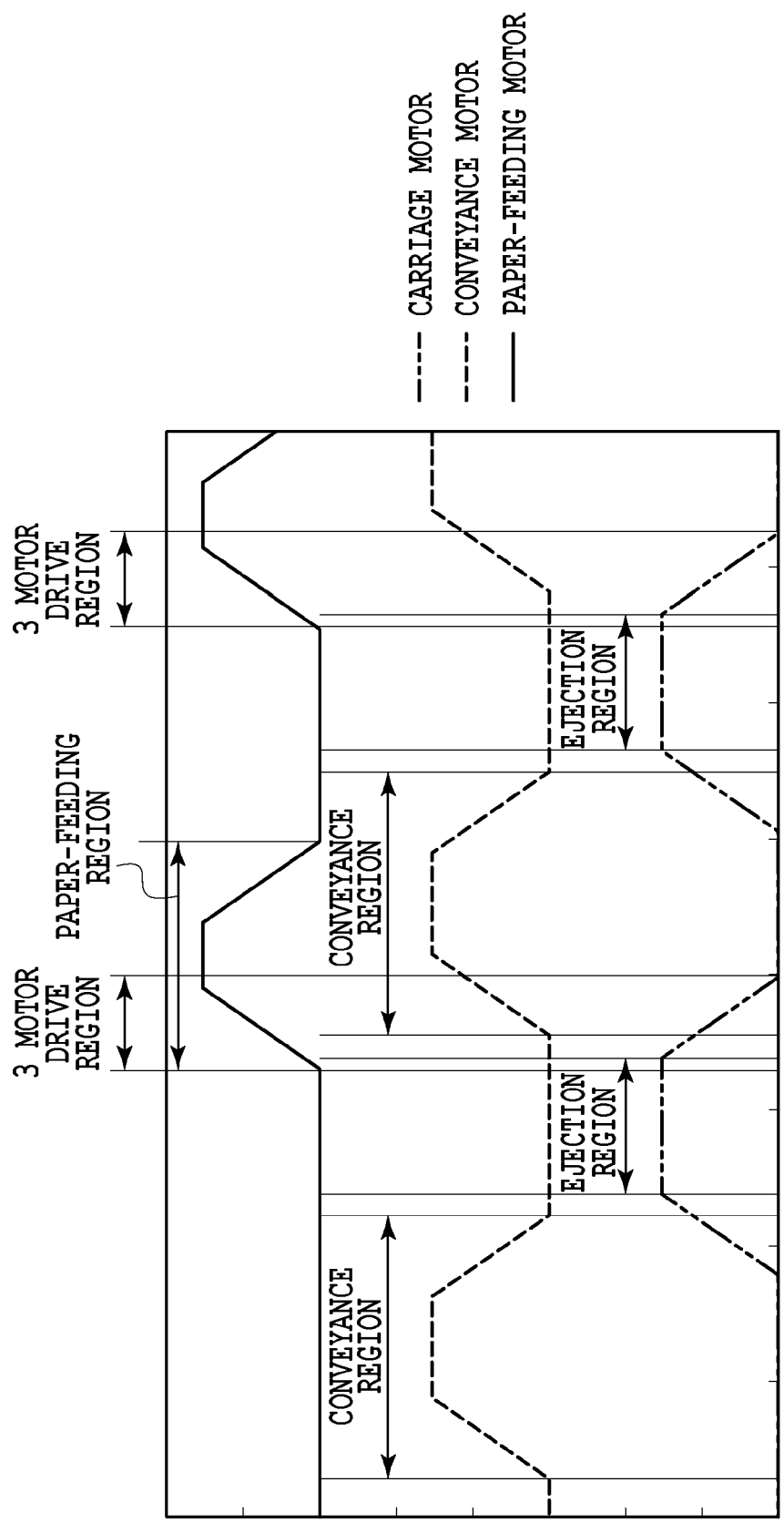
FIG. 2 is a graph of speed of each drive motor during sequential conveyance.

FIG. 2 is a graph illustrating speed of each drive motor during sequential conveyance, and illustrating drive timing of each drive motor. In order to speedup the printing, after the print head 101 finishes ejection, the conveyance roller 104 and the paper-discharging roller 105 start driving while the scanning body 102 slows down the speed, and feeds a predetermined amount of paper. In order for the print head 101 to perform the ejection right after the conveyance roller 104 and the paper-discharging roller 105 stop, the scanning body 102 calculates a time when the conveyance roller 104 and the paper-discharging roller 105 can stop during acceleration, and starts driving. In the case of printing plural sheets, a predetermined amount of paper is fed before the print medium is discharged, a paper-feeding motor is driven, and then the print medium is fed to a position right before the conveyance roller 104.

Figure 3A:
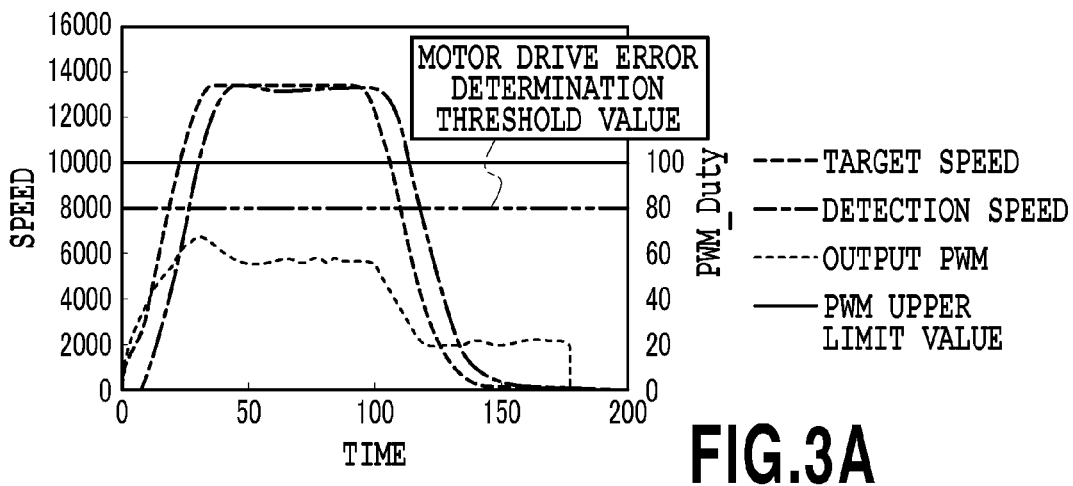
FIG. 3A is a graph illustrating speed of a motor and PWM duty.
Figure 3B:
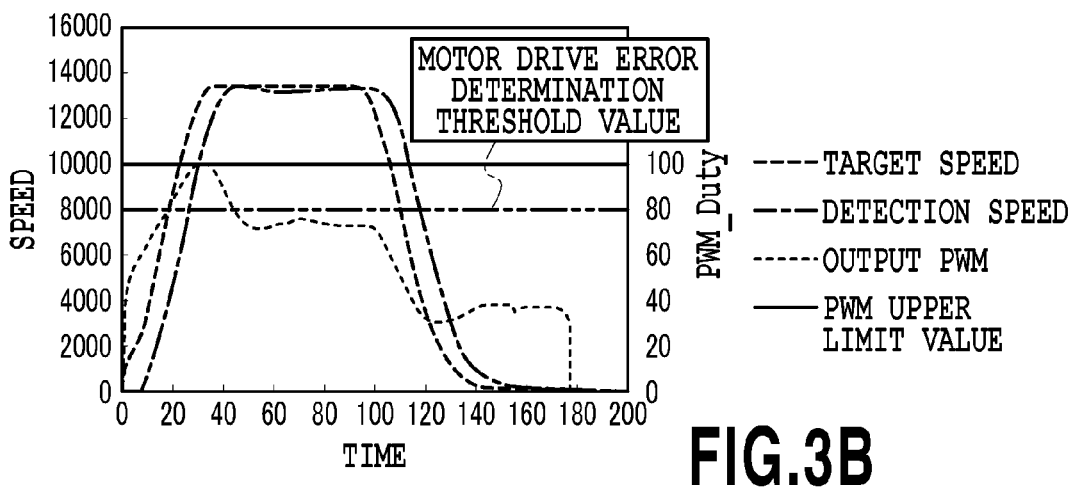
FIG. 3B is a graph illustrating the speed of the motor and the PWM duty.
Figure 3C:
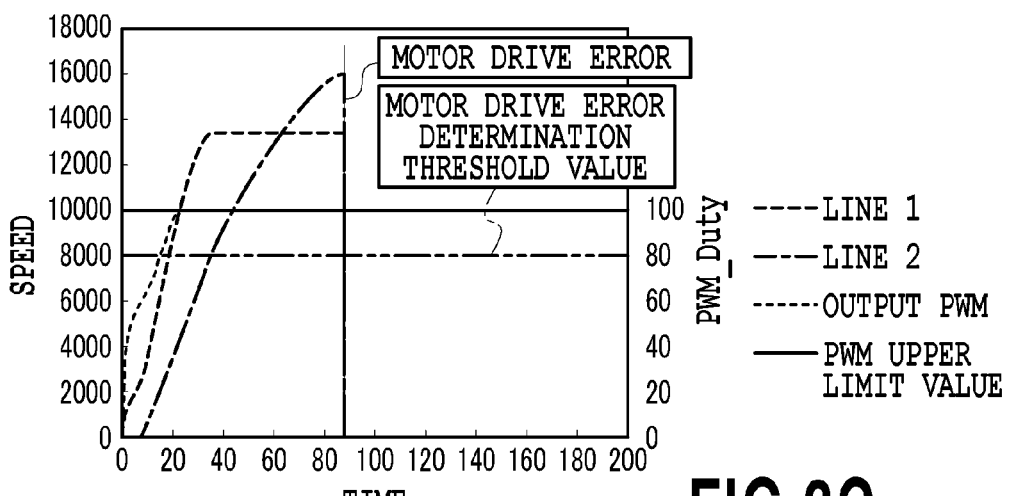
FIG. 3C is a graph illustrating the speed of the motor and the PWM duty.

FIGS. 3A, 3B and 3C are graphs illustrating waveforms of the speed and the PWM duty of one drive motor. Here, the PWM duty refers to a ratio between pulse widths of on and off in the case where the current is supplied to the drive motor. FIG. 3A indicates a normal state, and the PWM duty drives without exceeding a determination threshold value (permissible value) all the time. FIG. 3B indicates a case of a temperature-rising state due to sequential use or the like of the drive motor and a state after endurance thereof. In the temperature-rising state of the drive motor and after the endurance thereof, the PWM duty during the acceleration becomes higher than usual to thereby exceed a determination threshold value, but subsequently, the drive motor is stably driven at a value smaller than the determination threshold value. Furthermore, FIG. 3C illustrates a state where jamming has occurred. Meanwhile, the jamming refers to both of jamming in which the print medium is stuck to thereby cause conveyance failure and jamming in which the carriage comes into contact with the print medium to thereby cause problems of movement. In the case where jamming occurs, since a load due to the jamming is applied to the motor, the PWM duty is increased to the upper limit so as to compensate for the load.

Figure 4:
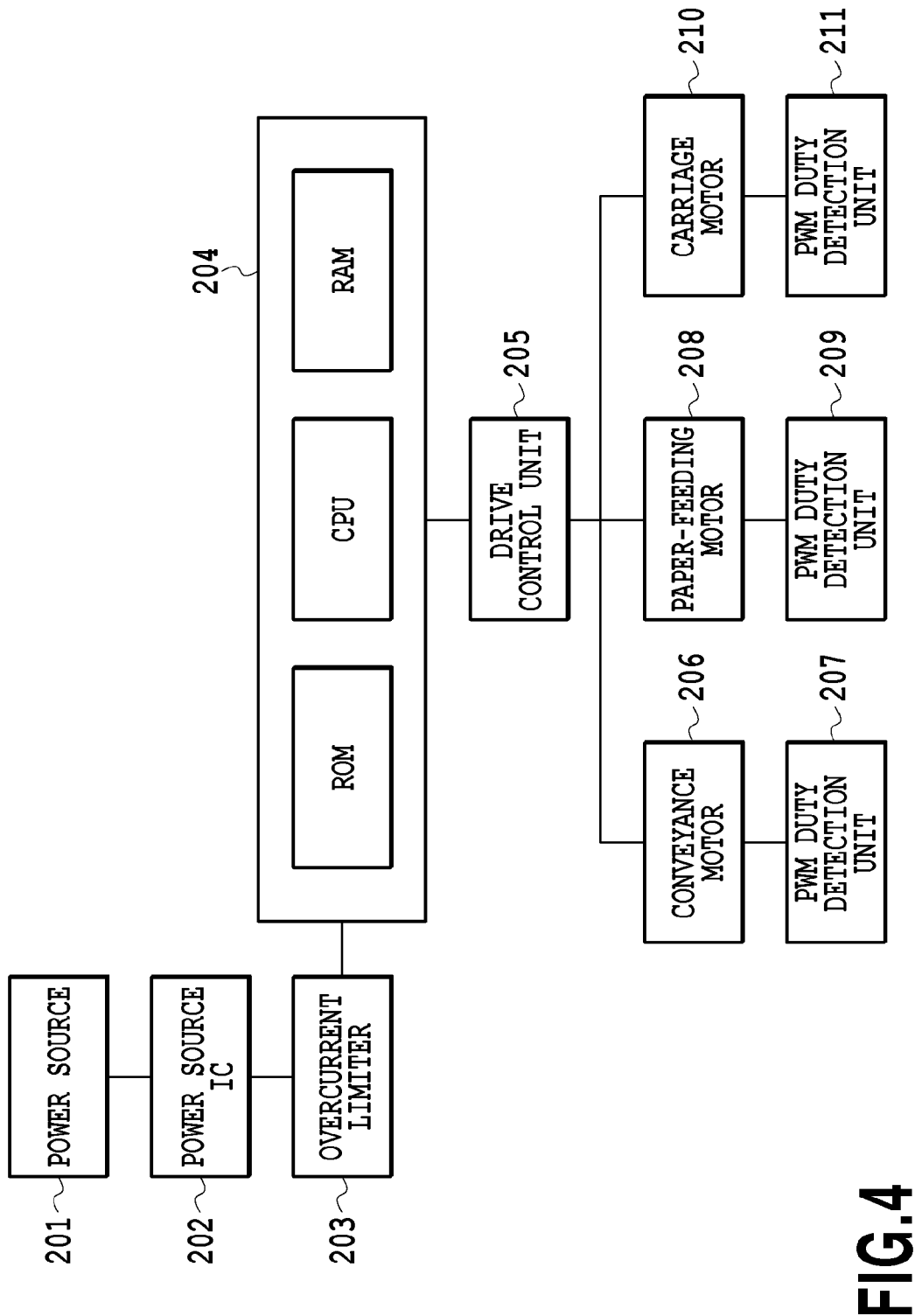
FIG. 4 is a block diagram of an ink-jet print apparatus according to an embodiment of the present invention.

FIG. 4 is a block diagram illustrating an ink-jet print apparatus according to the embodiment of the present invention. An overcurrent limiter 203 for detecting the current flowing to the power source is provided between a power source 201 and a control unit 204, and in the case where a predetermined amount or more of current is continued for a predetermined time, the overcurrent limiter 203 is operated, and thus a power source IC 202 performs latch to thereby turn off the power source 201. The power source of the power source IC 202 is not turned off until the charge of an electrolysis capacitor is lost, and in the meantime, the power source IC 202 continues to perform the latch.

A drive control unit 205 is connected with the conveyance motor 110, the paper-feeding motor 111, the carriage motor 107, and each motor is connected with each of PWM duty detection units 207, 209 and 211. The PWM duty detection units 207, 209 and 211 detect the PWM duty of the motor at the time of driving under the PWM control. Depending on a detection result of the PWM duty detection units 207, 209 and 211, the drive control unit 205 determines whether or not the PWM duty of the motor exceeds the threshold value for a predetermined time or longer.

FIGS. 5A, 5B, 5C and 5D are, in the conventional control, graphs illustrating the PWM duty of the drive motor and the waveforms of the current values of the power source in the case where three drive motors are simultaneously driven. FIG. 5A illustrates a normal state, and FIG. 5B illustrates a state in the case where jamming occurs.

FIG. 5A illustrates a case where three motors are simultaneously driven. According to this example, the PWM duty of the conveyance motor exceeds a motor drive error determination threshold value MTh at a time T1, and after a predetermined time Tm has elapsed, it becomes smaller than the motor drive error determination threshold value MTh at a time T2. In this case, although a normal operation is performed, a motor drive error occurs due to overshoot of the PWM duty to thereby stop the conveyance motor, and then sheet conveyance is stopped; that is, a print operation is stopped.

FIG. 5B illustrates a case where jamming occurs while the printing is performed. According to this example, the PWM duty of the conveyance motor exceeds the motor drive error determination threshold value MTh at a time T3 due to the jamming, and then, at a time T5 when the predetermined time Tm has elapsed, the motor drive error occurs to stop the conveyance motor. Since the time T5 when the conveyance motor stops is before a time T6 when, after the power source current exceeds an overcurrent limit CTh at the time T4, the time Tg has elapsed to shut down the conveyance motor, the power source is not shut down. In the case where the jamming occurs, stop of the conveyance motor without shutting down the power source is a desired operation, but it is not preferable that the conveyance motor is unexpectedly stopped in the normal operation due to the motor drive error.

Therefore, in order to prevent the motor from stopping in the normal drive operation by performing the conventional PWM duty monitor as illustrated in FIG. 5A, it can be considered that the motor drive error determination threshold value MTh is increased as illustrated in FIGS. 5C and 5D. Here, the operation is assumed by setting the motor drive error determination threshold value MTh as 100. By increasing the motor drive error determination threshold value MTh, as illustrated in FIG. 5C, since the PWM duty of the conveyance motor becomes lower than the motor drive error determination threshold value at a time T8 after the elapse of a time Tn that is less than the predetermined time Tm, the motor drive error does not occur. Namely, the motor can be prevented from stopping by the normal drive operation.

However, in the case where the motor drive error determination threshold value MTh is increased, new problems are caused. In the case of the occurrence of the jamming, as illustrated in FIG. 5D, the PWM duty of the conveyance motor reaches the motor drive error determination threshold value MTh at a time T11 after a time T10 when the power source current exceeds the overcurrent limit CTh. A time T13 after the predetermined time Tm that causes the motor drive error has elapsed comes later than a time T12 when the time Tg has elapsed from the time T10 after the current value exceeds the overcurrent limit CTh, and thus the power source is shut down. As described above, even in the case where the motor drive error determination threshold value MTh is increased and thus stopping of the motor is prevented in the normal drive operation, the power source may be shut down in the case of the occurrence of the jamming.

Furthermore, as another method for preventing stopping of the motor in the normal drive operation, it is considered that the motor drive error determination threshold value MTh remains as it is, and the predetermined time Tm for determining that the motor drive error determination threshold value MTh is exceeded is set longer. However, even in the case where the method described above can prevent stop of the motor in the normal drive operation, the power source is shut down at the time of the occurrence of the jamming.

Therefore, according to the present embodiment, in the case where a plurality of motors is simultaneously driven, monitoring of the motor load is skipped during an acceleration operation of the motor and the occurrence of the overshoot in which the PWM duty exceeds the threshold value during the acceleration is prevented. In addition, detection of a drive error is started by monitoring the motor load, after acceleration control has been finished, the predetermined time has elapsed, and the PWM duty has been stabilized.

Figure 6A:
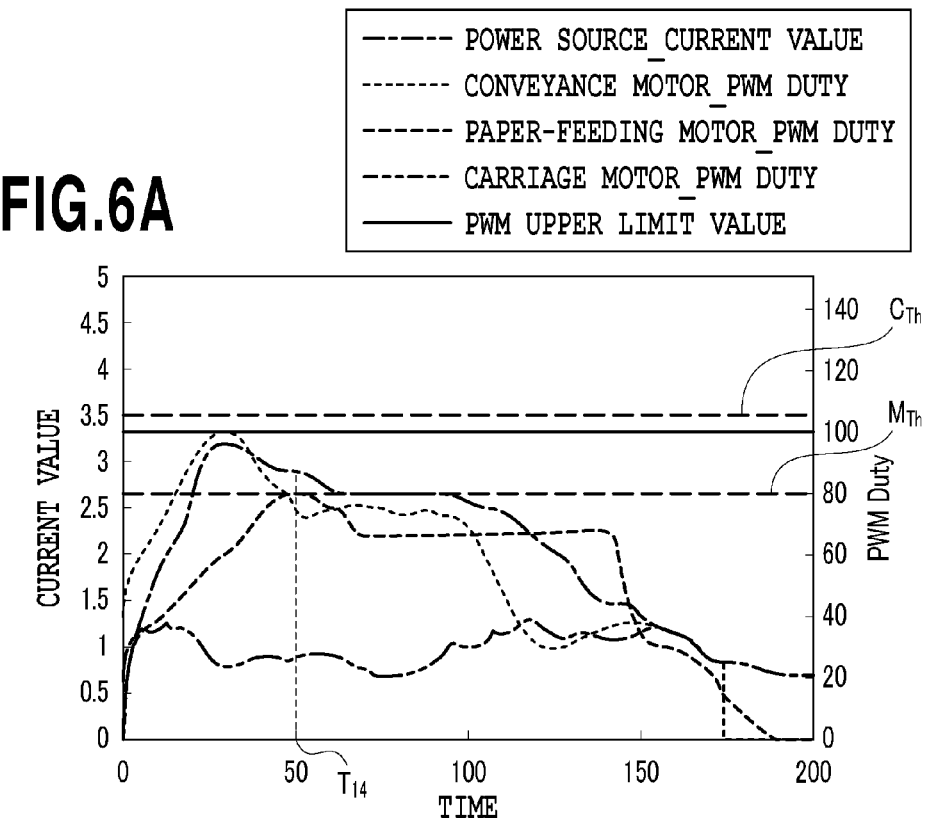
FIG. 6A is a graph illustrating a PWM duty of a motor and a waveform of a current value of a power source according to an embodiment.
Figure 6B:
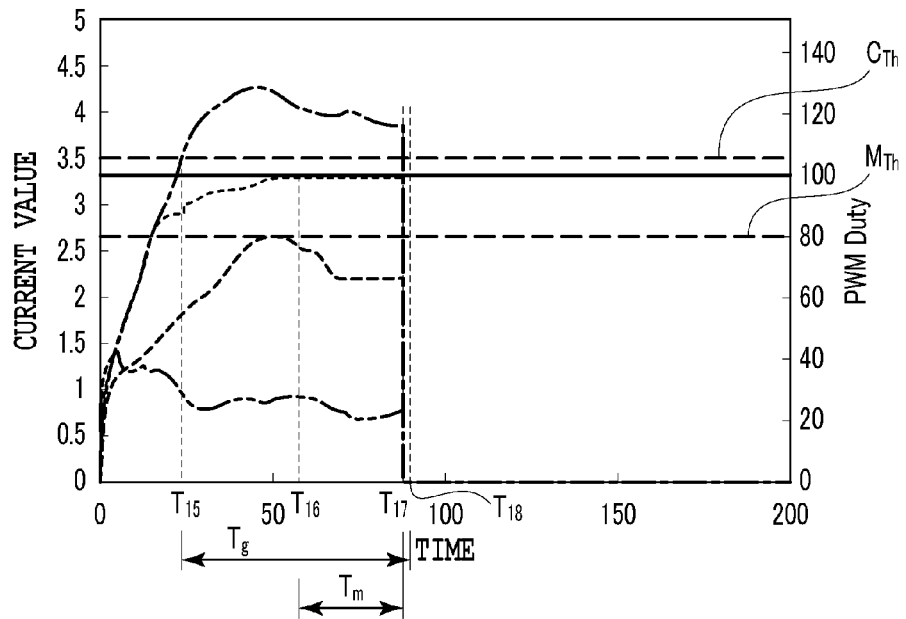
FIG. 6B is a graph illustrating the PWM duty of the motor and the waveform of the current value of the power source according to the embodiment.

FIGS. 6A and 6B are graphs illustrating, in the control according to the present embodiment, the PWM duty of the drive motor and the waveform of the current value of the power source in the case where the plurality of drive motors is simultaneously driven. According to the present embodiment, after the acceleration control operation of the motor has been finished and then the PWM duty is stabilized, the detection of the PWM duty is started. As illustrated in FIG. 6A, the acceleration of the motor becomes less than a predetermined value while being decreased, and at a time T14 when the predetermined time has elapsed, the PWM duty of any motor has a value lower than the motor drive error determination threshold value MTh. Therefore, the motor drive error does not occur and the drive can be continued. Furthermore, since the power source current does not exceed the overcurrent limit CTh all the time to thereby drive the motor, the power protection circuit is operated in the normal operation and thus the power source is never shut down.

FIG. 6B describes control in the case where jamming occurs. As illustrated in FIG. 6B, in the case where a state in which the power source current exceeds the overcurrent limit CTh continues for a period of the time Tg at a time T15, the power source protection circuit is set so as to shut down the power source at a time T18. Here, the PWM duty of the conveyance motor started at a time T16 when the predetermined time has elapsed after the acceleration of the motor has finished becomes the motor drive error at a time T17 when the time Tm has elapsed. Since the time T16 is a time just before a time T18 when the power source protection circuit is operated, the conveyance motor can be stopped before the power source is shut down even in the case where jamming occurs. Namely, operation conditions of the power source protection circuit and conditions of stop of the motor are associated with each other so that, in the case where the motor load exceeds a tolerance, the motor drive is stopped before the power source protection circuit is operated. With this arrangement, the power source protection circuit is operated before the motor is stopped by monitoring the motor load, and thus a situation of stopping of an entire apparatus is avoided.

Figure 7:
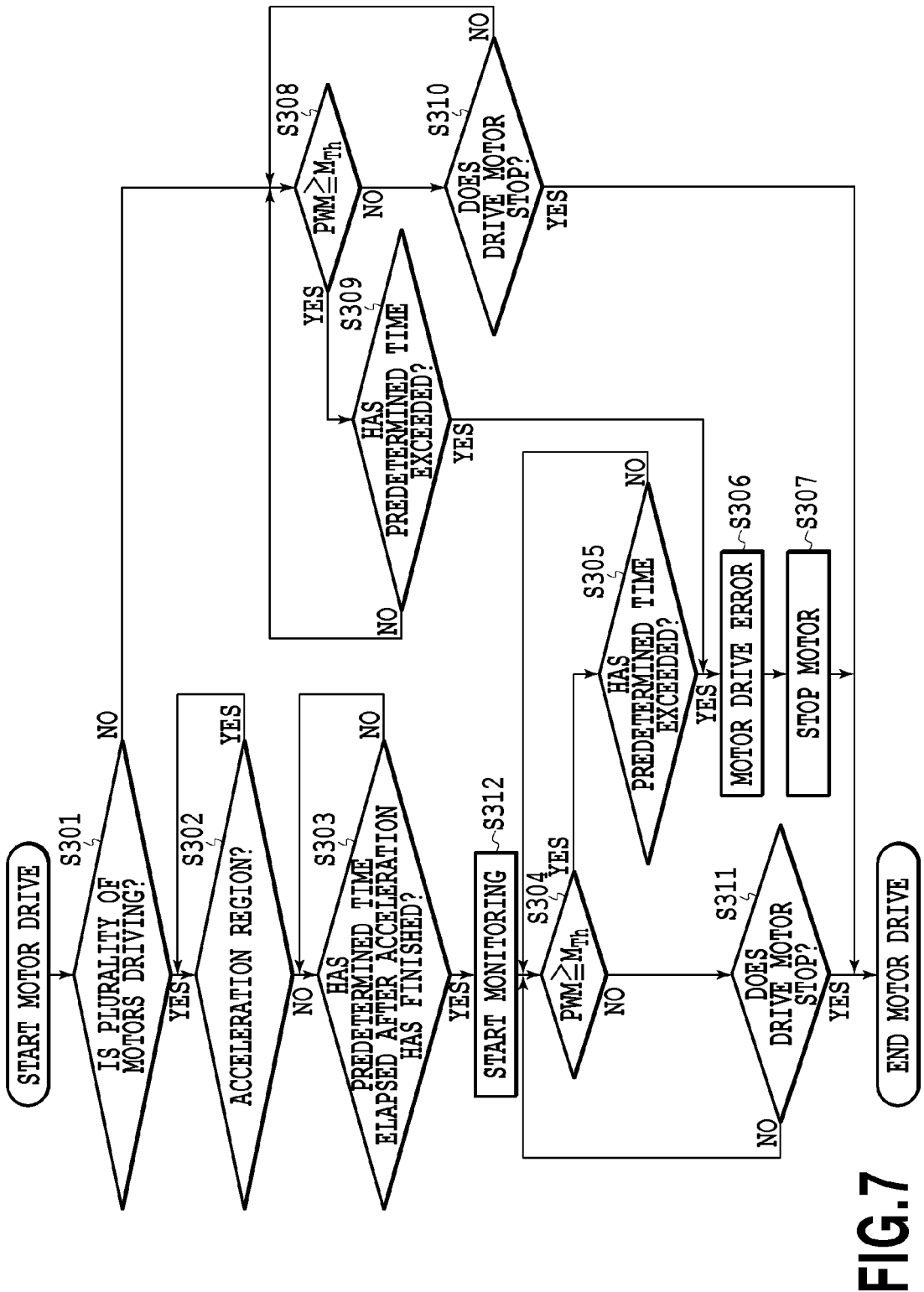
FIG. 7 is a motor drive error determination flowchart of the drive motor.

FIG. 7 is a motor drive error determination flowchart of the drive motor according to the embodiment of the present invention that is executed by the PWM duty detection units 207, 209, and 211 illustrated in FIG. 4. Hereinafter, the motor drive control of the present invention will be described according to the flowchart.

Upon the start of the motor drive control, in step S301, it is first determined whether or not, after the motor drive is started, the plurality of drive motors is simultaneously driven. In the case where only one drive motor is driven, the processing proceeds to step S308. In addition, similarly to the prior PWM duty detection, the PWM duty is monitored immediately after the drive has been started, and in the case where the PWM duty of the motor drive error determination threshold value MTh or more is detected for the predetermined time Tm or more, then in step S306, the drive motor is stopped as the motor drive error in step S307.

In the case where it is determined that the plurality of drive motors is simultaneously driven in step S301 and the current value is applied into the motor so as to cause the power source protection circuit to work, then in step S302, it is determined whether or not the motor performs the acceleration by the predetermined amount or more. In addition, in step S303, it is determined whether or not the predetermined time has elapsed since the acceleration has ended. In the case where the predetermined time has elapsed, the monitoring of the PWM duty is started in step S312. In step S304, it is determined whether or not the PWM duty is the motor drive error determination threshold value MTh or more. In the case where the determination of No is made (No in step S304), the processing proceeds uninterrupted, and stopping of the motor by completion of the processing waits. Subsequently, it is confirmed whether or not the motor has been stopped in Step S311 and in the case where the motor has been stopped, the processing is ended.

Furthermore, in the case where the determination of Yes is made (YES in step S304), the processing proceeds to step S305. It is confirmed whether or not the PWM duty is detected for the predetermined time Tm or more. In the case where the confirmation of Yes is made, the processing proceeds to step S306, and then, in step S307, the drive motor is stopped as the motor drive error. In a region where the PWM duty is stable, the detection of the PWM duty is performed. With this arrangement, even if the error determination threshold value is not increased, stop of the motor can be prevented in the normal drive operation, and in the case of jamming and the like, the motor can be stopped with the drive error before the power source is shut down.

In the case where a single drive motor is driven, the threshold value for detecting the PWM duty in step S308 is larger than the threshold value in the case where the plurality of drive motors is driven. According to the present embodiment, 100% is set. In addition, the PWM duty is detected also during the acceleration operation since the drive motor has started to be driven, a state where the PWM duty is the threshold value of 100% or more continues, and the drive motor is stopped after the elapse of the predetermined time Tm. With this arrangement, since the motor can be stopped swiftly even in the case where the motor is not rotated due to occurrence of jamming and thus the load is increased (motor current is increased), damages of the sheet and the drive motor can be reduced. In the case where only a single drive motor is driven, the power source has a margin, and thus the voltage is not lowered. Similarly to the conventional method, the motor load has been monitored since the acceleration operation has been performed.

On the other hand, in the case where the plurality of drive motors is driven, the threshold value for detecting the PWM duty in step S304 is set smaller than the threshold value in the case the single drive motor is driven. Specifically, the threshold value is set to 80% that is higher than the PWM duty in a constant speed region in a temperature-rising state and an endurance state of the drive motor. In the PWM duty detection, in the case where the PWM duty of the threshold value or more is detected the predetermined time or longer, then in step S306, the PWM duty is determined as the motor drive error.

As described above, in the case where the plurality of motors is simultaneously driven, monitoring of the motor load is skipped during the acceleration operation, and a motor load determination threshold value is made smaller. Even in the case where jamming occurs during the acceleration in which the load is not monitored, since the threshold value is soon exceeded after the acceleration control is ended and the load monitor is started, the motor is not stopped immediately, thereby resulting in not deteriorating the jamming.

A total time of the predetermined time having elapsed from the acceleration of the motor has been ended and the predetermined time Tm when the error determination is made by detection of the PWM duty is set shorter than the predetermined time Tg when the overcurrent limiter of the power source protection circuit is determined. Here, the predetermined time elapsing from the completion of the acceleration of the motor is a time until the PWM duty becomes lower than the motor drive error determination threshold value MTh after the acceleration of the motor becomes the predetermined value or less, and a value obtained by experiment data is stored in the apparatus.

Furthermore, also as to the predetermined time Tm for determining an error because the PWM duty exceeds the motor drive error determination threshold value MTh, an optimum time corresponding to characteristic of each motor is stored by the apparatus. As described above, the operation conditions of the power source protection circuit and the conditions of stopping the motor are associated with each other so that, in the case where the motor load exceeds a tolerance, the motor drive is stopped before the power source protection circuit is operated. A situation is avoided in which the power source protection circuit is operated before stop of the motor by monitoring the motor load, to thereby stop the entire apparatus.

According to the above-described embodiment, in the case where the plurality of motors is simultaneously driven, the motor load is not monitored during the acceleration operation, and monitoring of the motor load is started after the PWM duty passes an acceleration control region and becomes stable. With this arrangement, the overshoot in which the PWM duty exceeds a threshold value during the acceleration of the motor can be prevented. Furthermore, in the case where the motor drive load is increased due to the occurrence of jamming, the motor can be stopped before the power source is shut down.

As described above, in the apparatus including the plurality of motors driven by the common power source, even in the case where the motor load exceeds a tolerance, easy shutdown of the power source can be prevented. From a different perspective, even with a compact and an inexpensive power source having a smaller capacity than the conventional ones, a situation can be alleviated in which unexpected power shutdown occurs and the user is kept waiting for a long time to recover the power source. Therefore, both of user's convenience and miniaturization/cost reduction of the apparatus due to a smaller capacity of the power source can be achieved.

According to the above-described embodiment, in order not to monitor the motor load during the acceleration operation, the monitor operation is skipped during the acceleration operation, but this embodiment has no limitations. For example, the threshold value of the monitor may be temporarily set to be sufficiently large only during the acceleration operation, and the overshoot in which the motor load exceeds the threshold value may become unable to be detected. Even in such an embodiment, the motor load is not substantially monitored during the acceleration operation. According to interpretation of the present invention, "the motor load is not monitored during the acceleration operation" includes any embodiment described above.

Furthermore, according to the embodiment described above, the PWM duty of the drive motor under the PWM control is detected as information for knowing the motor load, but a method for knowing the motor load is not limited to the embodiment. For example, the information about the motor load may be obtained through detection of each current value of the plurality of drive motors, by the current detection circuit.

Moreover, according to the above-described embodiment, monitoring of the motor load and the drive control are performed on each of three drive motors, but there are no limitations to the similar control of all motors. For example, the above-described control may be performed only on a drive motor which applies a larger load to a power source and which is dominant among the whole derive motors. Namely, it is sufficient that the control of monitoring the motor load and stopping the motor drive in the case where the motor load exceeds a tolerance is performed on at least one of a plurality of motors including the first motor and the second motor driven by one common power source.

For example, since the heaviest load is applied to the conveyance motor 110 in the print apparatus, the control of monitoring the motor load and stopping the motor drive in the case where the motor load exceeds a tolerance may be performed only on the conveyance motor 110 and the above-described control may not be performed on the carriage motor 107 and the paper-feeding motor 111.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-272252, filed Dec. 27, 2013, which is hereby incorporated by reference wherein in its entirety.

What is claimed is:

1. A motor control method performed by a controller, comprising:
    monitoring a motor load of at least one of a plurality of motors including a first motor and a second motor driven by one common power source having a protection circuit, wherein the protection circuit is operated to shut down the power source in a case where a current value of the power source continues to exceed a threshold Cth during a period Tg;
    stopping motor drive in a case where the monitored motor load continues to exceed a threshold Mth during a period Tm, which is shorter than the period Tg; and
    in a first operation where both the first motor and the second motor are driven, skipping the monitoring of the motor load during acceleration operations of the first motor and the second motor and then starting the monitoring of the motor load, and in a second operation where the first motor is driven and the second motor is not driven, monitoring the motor load during the acceleration operation of the first motor,
    wherein the threshold Mth in monitoring the motor load in the first operation is lower than in monitoring the motor load in the second operation.

2. The motor control method according to claim 1, wherein, in a case where the motor load continues to exceed the threshold Mth during the period Tm, stopping the motor drive before the protection circuit is operated.

3. The motor control method according to claim 1,
    wherein, in the first operation, monitoring of the motor load is started after a predetermined time following an acceleration control operation of the motor that is monitored.

4. The motor control method according to claim 1, wherein the motor load is PWM duty under PWM control of the motor or a value of a current flowing in the motor.

5. The motor control method according to claim 1, wherein the plurality of motors is a drive motor of a carriage moving with a print head mounted, a drive motor of a paper-feeding mechanism of a print medium, and a drive motor of a conveyance mechanism conveying the print medium in a case of printing.

6. A print apparatus comprising:
- a power source having a protection circuit, wherein the protection circuit is operated to shut down the power source in a case where a current value of the power source continues to exceed a threshold Cth during a period Tg,
- a plurality of motors including a first motor and a second motor driven by the power source; and
- a control unit configured to monitor a motor load of at least one motor and to stop motor drive in a case where the monitored motor load continues to exceed a threshold Mth during a period Tm, which is shorter than the period Tg; and
- wherein, in a first operation where both the first motor and the second motor are driven, the control unit skips the monitoring of the motor load during acceleration operations of the first motor and the second motor and then starts the monitoring of the motor load, and in a second operation where the first motor is driven and the second motor is not driven, the control unit monitors the motor load during the acceleration operation of the first motor,
- wherein the threshold Mth in monitoring the motor load in the first operation is lower than in monitoring the motor load in the second operation.

7. The print apparatus according to claim 6, wherein the first motor is a drive motor of a conveyance mechanism conveying a print medium in a case of printing, and a second motor is either a drive motor of a carriage moving with a print head mounted or a drive motor of a paper-feeding mechanism of the print medium.

\* \* \* \* \*